Inventor:
C. Engelen

Patented Sept. 6, 1932

1,876,137

UNITED STATES PATENT OFFICE

CARL ENGELEN, OF OEDINGBERGE POST GLANDORF BEZIRK OSNABRUCK, GERMANY

HARVESTING MACHINE

Application filed November 25, 1929, Serial No. 409,679, and in Germany November 24, 1928.

The present invention relates to harvesting machines and especially to potato diggers.

An important feature of the invention is, that the grate basket is formed from rigid or yielding grate bars of any desired cross-section which bars are movable relatively to each other. In order to facilitate the separation of the weeds or vines one side of the sieve or grate basket is kept lower than the other one. Further, suitable weed removing devices may be provided. Behind the grate basket a conveyer device may be arranged on which stones, clods of earth and the like finally are removed.

A constructional form of the invention is shown by way of example in the accompanying drawing, in which, Fig. 1 is a side view, partially in section of a machine according to the invention.

Figure 1:
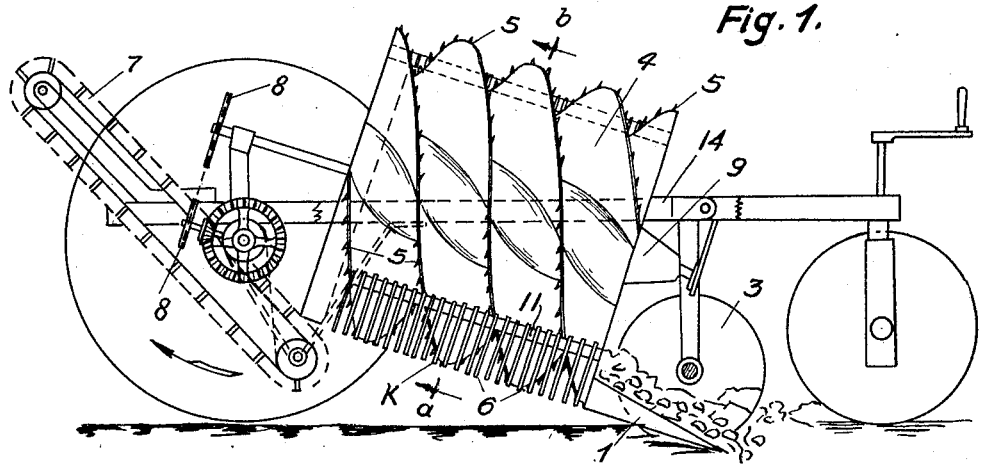
Figure 2:
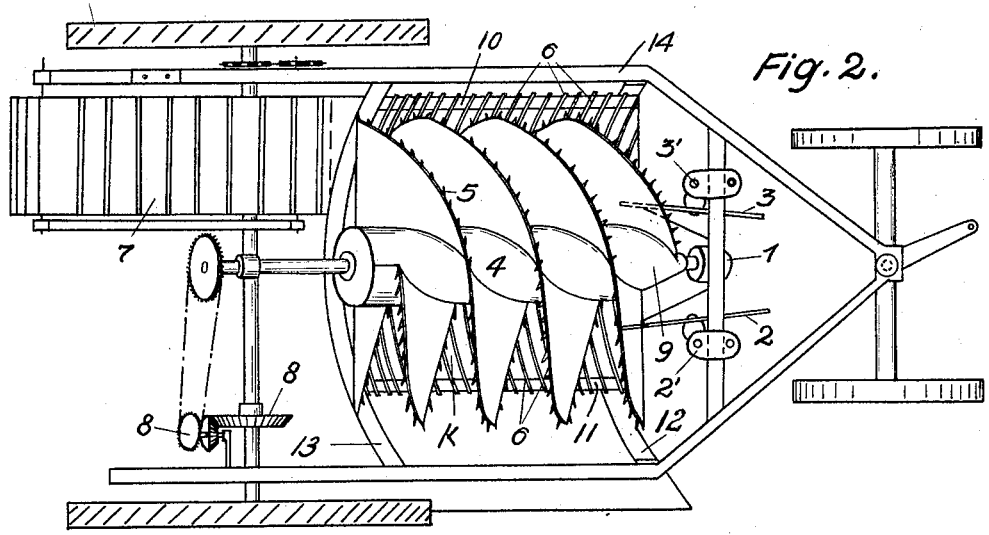
Fig. 2 is a plan view of the same machine.

A horizontal or inclined digging shoe 1 lifts the earth with the potatoes and the weeds. In order to prevent the earth from clinging to the digging shoe or from dropping down laterally discs 2, 3 are mounted to rotate at the sides of the said shoe. These discs may at 2′ and 3′ be adjusted in all directions.

On account of the earth adhering to the said discs the earth will be moved over a further distance because the rotation of the discs is caused by the same rolling on the earth. In order to increase the driving force the said discs may for instance be formed with toothed or wave-shaped peripheries.

A worm conveyor 4 having one, two or more threads or spiral fins of any desired pitch catches the earth mass and conveys the same into a basket, which is arranged below the worm and which is disposed horizontally or is inclined towards the direction of driving. The basket K consists of a plurality of longitudinal and inclined members 10 and 11 mounted on the two cross bars 12 and 13 which latter are supported on the machine frame 14. In addition, the basket K is provided with a series of transverse grate bars or rods 6, which for instance may be arranged transversely to the direction of driving of the vehicle, and which are formed in such a manner that the earth will immediately drop out from the machine, whereas the potatoes will be conveyed to the rear part of the machine by means of the worm or conveyer 4.

The worm may be formed with a continuous or with an interrupted thread. In the latter case a propeller-shaped body is obtained.

The outer periphery of the worm is equipped with projecting members, which for instance may have the form of pins 5 and which are arranged according to the space between the grate bars 6. During the rotation of the worm the pins 5 will engage with the said bars, which on account of their great length will not be deflected laterally to such a degree, that potatoes of normal size can drop out between them. The grate basket will however be shaken rather vigorously, so that earth and rubbish and other foreign bodies are prevented from adhering to the parts of the same. Further, a weed which does not drop out at once will be cut into pieces, lifted and ejected from the machine.

By means of suitable devices such as for instance panels, wiping-off shovels or the like the weed may be deposited at such point where it does not hinder the further operation.

Figure 3:
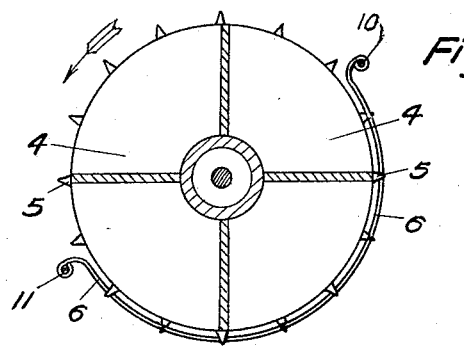
Fig. 3 is a cross-section on the line A—B in Fig. 1.

The sieve basket K may consist of single rods or of rods arranged in groups. The rods may be of circular, edged, triangular or of any other cross-section. In some cases the grate rods 6 are rigid and in other cases they are resiliently arranged, for instance in the manner indicated in Fig. 3, so that the pinching of stones, potatoes and the like between them is effectively prevented. The ends of the rods are bent or otherwise formed in such a manner, that weeds and the like can not cling to the same. The basket encloses the worm only partially and is tilted to one side so that one side of the basket is lying on a relatively low level, as seen in Figs. 1 and 3. As the worm 4 (Fig. 3) revolves in an anti-clockwise direction indicated by the arrow thereon, it is evident that the weeds in the worm will be freed from the basket K at the right, and near the top of the worm 4. As the worm continues to revolve further, the weeds are carried along on the top of the worm and deposited on the ground tangentially by gravity therefrom on the left side of the worm 4.

At the inner end of the worm the potatoes are delivered to any suitable conveyor device 7, for instance an elevator, which is adapted to lift the potatoes. Simultaneously stones and other foreign bodies may be removed manually so that only pure potatoes are delivered into the carts, baskets, bags or other containers to be filled. The potatoes may also if desired be deposited in rows or groups in any desired manner.

The worm driving mechanism 8 may be actuated in different manners, for instance by means of a suitable gearing from the wheels of the machine, from a motor attached to the machine, or from the driving shaft of the tractor.

In order to prevent the weeds from clinging to the front parts of the worm a fixed or movable conical or cylindrical protective mantle 9 is provided, which for operating in tall weeds may be equipped with cutting devices.

The worm has preferably a diameter of about 500 mm. or more. The grate bars are adjustably arranged so that the width of the intermediate spaces between the same may be varied within reasonable limits.

The pins 5 may be arranged in inclined positions and may also be connected in such a manner that they may be adjusted relatively to the periphery of the worm. In order to reduce wear and friction the pins may be equipped with rollers. When designing the devices which receive the weed and the arrangements by means of which the weed is removed from the apparatus it should be borne in mind that the weed must be deposited in such manner and on such places, that the working of the machine is not hindered.

Having now particularly described and ascertained the nature of my said invention and in what manner the same is to be performed, I declare that what I claim is:—

1. In a machine for harvesting agricultural products, a plurality of resilient and relatively movable transverse rods forming a basket, a revoluble worm partially enclosed by said basket co-operating with said rods, for separating the weeds and other undesirable material from the products being gathered, and means for actuating the worm and rods by the forward travel of the machine.

2. In a machine for harvesting agricultural products, a plurality of resilient and relatively movable transverse rods forming a basket, mounted on the machine, a worm conveyor in the basket, a plurality of pins on the edges of the worm, for cutting weeds and separating out undesirable material from the products being gathered, and means for actuating the worm and rods during the travel of the machine.

3. In a machine for harvesting agricultural products, a revoluble worm conveyor mounted on the machine, a plurality of resilient relatively movable transverse rods extending substantially around half the periphery of the worm, and forming an open basket thereabout, and actuating means for operating the conveyor, and movable rods, to separate out the products being gathered, from the weeds and other undesirable material collected by the worm conveyor.

4. In a machine for harvesting agricultural products, a revoluble worm mounted longitudinally on the machine, a tilted open basket, comprising a plurality of resilient and relatively movable rods, in close and partially enclosing relation to the worm, and operating means for actuating the worm and rods by the forward progress of the machine.

5. In a machine for harvesting agricultural products, a revoluble worm mounted longitudinally on the machine, a plurality of pins mounted on the peripheral fins of the worm, a plurality of resilient and movable transverse rods forming a basket partially enclosing the worm and co-operating therewith, for separating out the products being gathered from the undesirable material collected by the worm.

6. In a machine for harvesting agricultural products, a revoluble worm, a tilted open basket mounted on the machine extending from a point near the top of one side of the worm, to a point on the opposite side of said worm, comprising a number of resilient and relatively movable transverse rods, for separating the products being gathered from the undesirable material collected by the worm, and a plurality of pins on the edges of the worm.

7. In a machine for harvesting agricultural products, a revoluble worm, a pair of longitudinal members mounted on the machine, a plurality of relatively movable transverse rods carried on the longitudinal members, forming a grate-like partially open basket enclosing the worm from a point near the top of one side of same, as seen in cross section, to a point somewhat above the bottom of the worm on the opposite side of the worm, and means on said worm for moving the grate-rods in relation to each other, during the rotation of the worm.

8. In a machine for harvesting agricultural products, a revoluble worm mounted on the machine, a plurality of transverse and relatively movable rods forming an open basket, said rods extending transversely from a point near the top of the worm on one side of the machine, to a point somewhat above the bottom of the worm on the opposite side of the machine, the bottom of said basket being inclined with relation to the ground surface, said worm being adapted, during rotation, to engage and move said movable rods, means for digging the products from the earth, and a pair of adjustable discs on the machine, co-operating with the digging means to guide and lift material collected, into the end of the worm.

In testimony whereof I have signed my name to this specification.

CARL ENGELEN.